(12) United States Patent
Clark et al.

(10) Patent No.: US 12,462,814 B2
(45) Date of Patent: Nov. 4, 2025

(54) BIT ERROR CORRECTION IN DIGITAL SPEECH

(71) Applicant: Digital Voice Systems, Inc., Westford, MA (US)

(72) Inventors: Thomas Clark, Westford, MA (US); John C. Hardwick, Acton, MA (US)

(73) Assignee: Digital Voice Systems, Inc., Westford, MA (US)

( * ) Notice: Subject to any disclaimer, the term of this patent is extended or adjusted under 35 U.S.C. 154(b) by 214 days.

(21) Appl. No.: 18/482,350

(22) Filed: Oct. 6, 2023

(65) Prior Publication Data

US 2025/0118309 A1    Apr. 10, 2025

(51) Int. Cl.
G10L 19/005    (2013.01)

(52) U.S. Cl.
CPC .................. G10L 19/005 (2013.01)

(58) Field of Classification Search
CPC ..................................................... G10L 19/005
See application file for complete search history.

(56) References Cited

U.S. PATENT DOCUMENTS

| | | |
|---|---|---|
| 3,622,704 A | 11/1971 | Ferrieu et al. |
| 3,903,366 A | 9/1975 | Coulter |
| 4,630,304 A | 12/1986 | Borth et al. |
| 4,710,960 A * | 12/1987 | Sato ........................ H04B 1/66 704/219 |
| 4,847,905 A | 7/1989 | Lefevre et al. |
| 4,932,061 A | 6/1990 | Kroon et al. |
| 4,944,013 A | 7/1990 | Gouvianakis et al. |
| 5,081,681 A | 1/1992 | Hardwick et al. |
| 5,086,475 A | 2/1992 | Kutaragi et al. |
| 5,193,140 A | 3/1993 | Minde |

(Continued)

FOREIGN PATENT DOCUMENTS

| | | |
|---|---|---|
| EP | 0893791 | 1/1999 |
| EP | 1020848 | 7/2000 |

(Continued)

OTHER PUBLICATIONS

International Search Report and Written Opinion in International Appln. No. PCT/US2024/049998, mailed on Dec. 6, 2024, 8 pages.

(Continued)

*Primary Examiner* — Mohammad K Islam
(74) *Attorney, Agent, or Firm* — Fish & Richardson P.C.

(57) ABSTRACT

This disclosure provides a method of decoding a digital speech signal, a speech decoder, a handset or mobile radio, and a base station or console. The method includes receiving a voice bit stream including at least one frame of bits that includes block codes, determining least confident bits in a first block code, generating candidates for the first block code based on the least confident bits, determining a first distance between each candidate and the first block code, and demodulating at least one other block code to obtain at least one demodulated vector. For each demodulated vector, a second distance between the demodulated vector and possible transmitted vectors is determined, and from the possible transmitted vectors, a vector corresponding to a minimum second distance is selected as a corrected demodulated vector. A minimum total distance is determined, and a candidate is selected as a corrected first block code.

15 Claims, 6 Drawing Sheets

(56) References Cited

U.S. PATENT DOCUMENTS

| | | |
|---|---|---|
| 5,195,166 A | 3/1993 | Hardwick et al. |
| 5,216,747 A | 6/1993 | Hardwick et al. |
| 5,226,084 A | 7/1993 | Hardwick et al. |
| 5,226,108 A | 7/1993 | Hardwick et al. |
| 5,247,579 A | 9/1993 | Hardwick et al. |
| 5,305,332 A * | 4/1994 | Ozawa ............... H04B 1/66 |
| | | 704/223 |
| 5,351,338 A | 9/1994 | Wigren |
| 5,491,772 A | 2/1996 | Hardwick et al. |
| 5,517,511 A | 5/1996 | Hardwick et al. |
| 5,581,656 A | 12/1996 | Hardwick et al. |
| 5,630,011 A | 5/1997 | Lim et al. |
| 5,649,050 A | 7/1997 | Hardwick et al. |
| 5,657,168 A | 8/1997 | Maruyama et al. |
| 5,664,051 A | 9/1997 | Hardwick et al. |
| 5,664,052 A | 9/1997 | Nishiguchi et al. |
| 5,696,874 A | 12/1997 | Taguchi |
| 5,701,390 A | 12/1997 | Griffin et al. |
| 5,715,365 A | 2/1998 | Griffin et al. |
| 5,742,930 A | 4/1998 | Howitt |
| 5,754,974 A | 5/1998 | Griffin et al. |
| 5,826,222 A | 10/1998 | Griffin |
| 5,870,405 A | 2/1999 | Hardwick et al. |
| 5,937,376 A | 8/1999 | Minde |
| 5,963,896 A | 10/1999 | Ozawa |
| 5,983,174 A | 11/1999 | Wong et al. |
| 6,018,706 A | 1/2000 | Huang et al. |
| 6,064,955 A | 5/2000 | Huang et al. |
| 6,131,084 A | 10/2000 | Hardwick |
| 6,161,089 A | 12/2000 | Hardwick |
| 6,199,067 B1 | 3/2001 | Geller |
| 6,377,916 B1 | 4/2002 | Hardwick |
| 6,484,139 B2 | 11/2002 | Yajima |
| 6,502,069 B1 | 12/2002 | Grill et al. |
| 6,526,376 B1 | 2/2003 | Villette et al. |
| 6,574,334 B1 | 6/2003 | Bartkowiak |
| 6,574,593 B1 | 6/2003 | Gao et al. |
| 6,675,148 B2 | 1/2004 | Hardwick |
| 6,691,084 B2 | 2/2004 | Manjunath et al. |
| 6,760,699 B1 | 7/2004 | Weerackody et al. |
| 6,895,373 B2 | 5/2005 | Garcia et al. |
| 6,912,495 B2 | 6/2005 | Griffin et al. |
| 6,931,373 B1 | 8/2005 | Bhaskar et al. |
| 6,954,726 B2 | 10/2005 | Brandel et al. |
| 6,963,833 B1 | 11/2005 | Singhal |
| 6,968,309 B1 * | 11/2005 | Makinen ............... G10L 19/005 |
| | | 704/223 |
| 7,016,831 B2 | 3/2006 | Suzuki et al. |
| 7,171,156 B2 | 1/2007 | Caffrey et al. |
| 7,289,952 B2 | 10/2007 | Yasunaga et al. |
| 7,310,596 B2 | 12/2007 | Ota et al. |
| 7,394,833 B2 | 7/2008 | Heikkinen et al. |
| 7,421,388 B2 | 9/2008 | Zinser et al. |
| 7,430,507 B2 | 9/2008 | Zinser, Jr. et al. |
| 7,519,530 B2 | 4/2009 | Kaajas et al. |
| 7,529,660 B2 | 5/2009 | Bessette et al. |
| 7,529,662 B2 | 5/2009 | Zinser, Jr. et al. |
| 7,634,399 B2 | 12/2009 | Hardwick |
| 7,957,963 B2 | 6/2011 | Hardwick |
| 7,970,606 B2 | 6/2011 | Hardwick |
| 8,050,397 B1 | 11/2011 | Read |
| 8,200,497 B2 | 6/2012 | Hardwick |
| 8,315,860 B2 | 11/2012 | Hardwick |
| 8,340,973 B2 | 12/2012 | Tsuchinaga et al. |
| 8,359,197 B2 | 1/2013 | Hardwick |
| 8,595,002 B2 | 11/2013 | Hardwick |
| 9,232,376 B2 | 1/2016 | Senese et al. |
| 11,715,477 B1 | 8/2023 | Griffin et al. |
| 2003/0135374 A1 | 7/2003 | Hardwick |
| 2003/0154073 A1 | 8/2003 | Ota et al. |
| 2004/0002856 A1 | 1/2004 | Bhaskar et al. |
| 2004/0093206 A1 | 5/2004 | Hardwick |
| 2004/0117178 A1 | 6/2004 | Ozawa |
| 2004/0153316 A1 | 8/2004 | Hardwick |
| 2004/0174984 A1 | 9/2004 | Jabri et al. |
| 2004/0253925 A1 | 12/2004 | Caffrey et al. |
| 2004/0260544 A1 | 12/2004 | Kikumoto |
| 2005/0278169 A1 | 12/2005 | Hardwick |
| 2005/0281289 A1 | 12/2005 | Huang et al. |
| 2010/0086140 A1 | 4/2010 | Chen et al. |
| 2010/0088089 A1 | 4/2010 | Hardwick |
| 2010/0094620 A1 | 4/2010 | Hardwick |
| 2011/0077940 A1 * | 3/2011 | Vos ............... G10L 19/005 |
| | | 704/229 |
| 2011/0208514 A1 | 8/2011 | Tsuchinaga et al. |
| 2011/0257965 A1 | 10/2011 | Hardwick |
| 2012/0266042 A1 | 10/2012 | Shen et al. |
| 2013/0144613 A1 | 6/2013 | Hardwick |
| 2014/0029733 A1 | 1/2014 | Smith et al. |
| 2014/0236587 A1 | 8/2014 | Subasingha et al. |
| 2016/0371028 A1 * | 12/2016 | Berman ............... G06F 12/00 |
| 2017/0325049 A1 | 11/2017 | Basu Mallick et al. |
| 2018/0358023 A1 * | 12/2018 | Sasaki ............... G10L 19/24 |
| 2021/0210106 A1 | 7/2021 | Clark et al. |
| 2021/0366498 A1 | 11/2021 | Tomasek et al. |
| 2023/0043682 A1 | 2/2023 | Hardwick |
| 2023/0144613 A1 | 5/2023 | Mauch et al. |
| 2023/0326473 A1 | 10/2023 | Clark et al. |
| 2024/0420707 A1 * | 12/2024 | Hassan ............... G10L 19/005 |

FOREIGN PATENT DOCUMENTS

| | | |
|---|---|---|
| EP | 1237284 | 9/2002 |
| JP | H05346797 | 12/1993 |
| JP | H10293600 | 11/1998 |
| WO | WO 1998004046 | 1/1998 |
| WO | WO 2007042350 | 4/2007 |

OTHER PUBLICATIONS

U.S. Appl. No. 17/387,412, filed Jul. 28, 2021, Hardwick.

International Search Report and Written Opinion in International Appln. No. PCT/US2021/012608, mailed on Mar. 31, 2021, 9 pages.

International Search Report and Written Opinion in International Appln. No. PCT/US2022/074176, mailed on Nov. 18, 2022, 11 pages.

International Search Report and Written Opinion in International Appln. No. PCT/US2023/017748, mailed on May 5, 2023, 6 pages.

International Search Report and Written Opinion in International Appln. No. PCT/US23/17755, mailed on Jul. 18, 2023, 12 pages.

Mears, "High-speed error correcting encoder/decoder," IBM Technical Disclosure Bulletin USA, Oct. 1980, 23(4):2135-2136.

Shoham, "High-quality speech coding at 2.4 to 4.0 kbps based on time-frequency interpolation," Presented at the Proceedings of the IEEE International Conference on Acoustics, Speech, and Signal Processing, Minneapolis, MN, USA, Apr. 27-30, 1993, 2:167-170.

[No Author Listed], "Project 25 Vocoder Description," TIA Standard, Feb. 2014, 162 pages.

* cited by examiner

BIT ERROR CORRECTION IN DIGITAL SPEECH

TECHNICAL FIELD

This disclosure relates generally to processing of digital speech.

BACKGROUND

Modern voice communications such as mobile radio and cellular telephony transmit voice as digital data, and in many cases where transmission bandwidth is limited, the voice data is compressed by a vocoder to reduce the data that must be transmitted. Similarly, voice recording and storage applications may also use digital voice data with a vocoder to reduce the amount of data that must be stored per unit time. In either case, the analog voice signal from a microphone is converted into a digital waveform using an Analog-to-Digital converter to produce a sequence of voice samples. In traditional telephony applications, speech is limited to 3-4 kHz of bandwidth and a sample rate of 8 kHz is used. In higher bandwidth applications, a corresponding higher sampling rate (such as 16 kHz or 32 kHz) may be used. The digital voice signal (i.e., the sequence of voice samples) is processed by the vocoder to reduce the overall amount of voice data. For example, a voice signal that is sampled at 8 kHz with 16 bits per sample results in a total voice data rate of 8,000×16=128,000 bits per second (bps), and a vocoder can be used to reduce the bit rate of this voice signal to rates of 2,000-8,000 bps (i.e., where 2,000 bps is a compression ratio of 64 and 8000 bps is a compression rate of 16) being achievable while still maintaining reasonable voice quality and intelligibility. Such large compression ratios are due to the large amount of redundancy within the voice signal and the inability of the ear to discern certain types of distortion. The result is that the vocoder forms a vital part of most modern voice communications systems where the reduction in data rate conserves precious Radio Frequency (RF) spectrum and provides economic benefits to both service providers and users.

Vocoders are employed by digital mobile radio systems including Project 25 (P25), Digital Private Mobile Radio (dPMR), Digital Mobile Radio (DMR), and Terrestrial Trunked Radio (TETRA), where a low bit rate vocoder, typically operating between 2-5 kbps, is used. For example, in P25 radio systems, a dual-rate vocoder operating at 2450 or 4400 bps (not including error control bits) is used, while in DMR radio systems, the vocoder operates at 2450 bps. In these and other radio systems, the vocoder is based on the Multiband Excitation (MBE) speech model, and variants include the Improved Multiband Excitation (IMBE™), Advanced Multiband Excitation (AMBE®), and AMBE+2™ vocoders. Telecommunications Industry Association (TIA) standard document 102BABA including the Half Rate Vocoder Annex describes a dual rate vocoder used in P25. While newer versions of this vocoder containing various additional features and enhancements have been developed and are in use in newer radio equipment, the IMBE™ vocoder described in TIA 102BABA is illustrative of the type of vocoder used in the systems described below. Other details of MBE vocoders are discussed in U.S. Pat. No. 7,970,606 ("Interoperable Vocoder") and U.S. Pat. No. 8,359,197 ("Half-rate Vocoder"), both of which are incorporated herein by reference.

A vocoder is divided into two primary functions: (i) an encoder that converts an input sequence of voice samples into a low-rate voice bit stream; and (ii) a decoder that reverses the encoding process and converts the low-rate voice bit stream back into a sequence of voice samples that are suitable for playback via a digital-to-analog converter and a loudspeaker.

SUMMARY

Techniques are provided for detecting and correcting bit errors in a digital speech or a voice bit stream of, for example, a P25, DMR, dPMR, Next Generation Digital Narrowband (NXDN™), Mototrbo™ or other digital mobile radio systems. The techniques provide an FEC decoder where a plurality of block codes are used to correct bit errors in a voice bit stream. The first block code among the plurality of block codes is used to modulate the remaining block codes. The first block code protects the most important vocoder data bits, and thus linking the remaining block codes to the first block code enhances the ability to detect bit errors in the first block code. The techniques permit correction of significantly more than three bit errors in the first block code by flipping every combination of the least confident bits of the first block code to correct bit errors.

In one general aspect, decoding a digital speech signal includes receiving a voice bit stream including at least one frame of bits, where each frame of bits includes block codes; determining least confident bits in a first block code among the block codes; generating candidates for the first block code based on the least confident bits; determining a first distance between each candidate and the first block code; and demodulating at least one other block code among the block codes based on the first block code to obtain at least one demodulated vector. For each demodulated vector, a second distance between the demodulated vector and possible transmitted vectors associated with the demodulated vector is determined; a vector corresponding to a minimum second distance is selected, from the possible transmitted vectors, as a corrected demodulated vector; a minimum total distance across all of the block codes is determined, where a total distance is a sum of the first distance and the minimum second distance associated with each demodulated vector; and a candidate is selected from the candidates for the first block code as a corrected first block code, where the selected candidate corresponds to the minimum total distance.

Implementations may include one or more of the following features.

Generating the candidates for the first block code may further include flipping a combination of one or more of the least confident bits, such that, when the number of least confident bits is $N_f$, the number of the candidates for the first block code is $2^{N_f}$. The method may further include decoding each of the candidates with a Golay decoder to generate decoded candidates, where the number of decoded candidates is $2^{N_f}$, and ignoring non-unique candidates among the decoded candidates to generate a set of unique candidates, where the number of unique candidates is less than $2^{N_f}$.

Demodulating the at least one other block code includes reversing a modulation of each of the at least one other block code to obtain the demodulated vector using a modulation sequence. The modulation sequence is seeded by one or more bits of the first block code. For example, the seed may be formed by dropping redundant bits in each candidate. The at least one demodulated vector may be a Golay code vector, a Hamming code vector, or a combination of the Golay code vector and the Hamming code vector.

A second minimum total distance may be determined across all of the block codes, and a difference between the minimum total distance and the second minimum total distance may be determined as a confidence measure.

The number of bit errors corrected in the block codes of each frame of bits may be determined, where the number of bit errors is the total number of bits flipped in both the corrected demodulated vector and the corrected first block code. The number of bit errors may be compared to a first threshold, a second minimum total distance across all of the block codes may be determined, and a difference between the minimum total distance and the second minimum total distance may be determined as a confidence measure and compared to a second threshold. A frame repeat may be performed based on the determination that the number of bit errors is more than the first threshold or the confidence measure is less than the second threshold.

The voice bit stream may be generated by an MBE vocoder, and the at least one frame of bits may include one or more of voice frames, silence frames, and data frames.

In another general aspect, a speech decoder is configured to receive a voice bit stream including at least one frame of bits, where each frame of bits includes block codes; determine least confident bits in a first block code among the block codes; generate candidates for the first block code based on the least confident bits; determine a first distance between each candidate and the first block code; and demodulate at least one other block code among the block codes based on the first block code to obtain at least one demodulated vector. For each demodulated vector, the speech decoder determines a second distance between the demodulated vector and possible transmitted vectors associated with the demodulated vector, selects, from the possible transmitted vectors, a vector corresponding to a minimum second distance as a corrected demodulated vector; determines a minimum total distance across all of the block codes, where a total distance is a sum of the first distance and the minimum second distance associated with each demodulated vector; and selects a candidate from the candidates for the first block code as a corrected first block code, where the selected candidate corresponds to the minimum total distance.

The techniques for bit error detection and correction discussed above and described in more detail below may be implemented by a speech decoder. The speech decoder may be included in, for example, a handset, a mobile radio, a base station or a console.

The details of one or more implementations of the subject matter are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Figure 1:
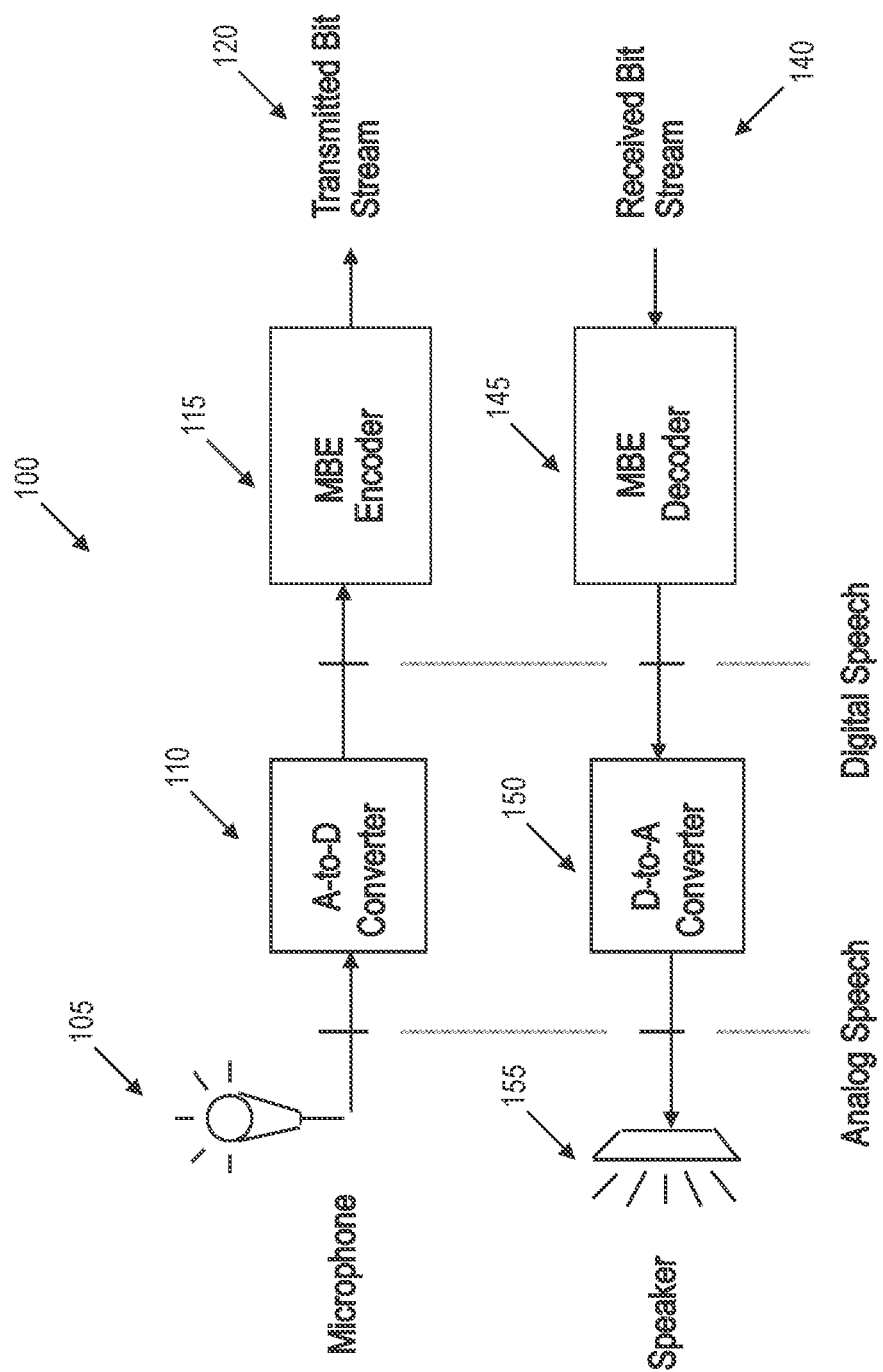
FIG. 1 is a block diagram of a vocoder.

The techniques provide a vocoder, such as an AMBE® or MBE vocoder, that includes an FEC (forward error correction) encoder and decoder in which block codes are used to protect the voice data from bit errors. The block codes may be, for example, Golay codes, Hamming codes, or a combination of both. The first block code is used to modulate the remaining block codes. Since the remaining block codes are modulated based on a seed derived from the first block code, any errors in the first block code can result in errors in the remaining block codes. In some implementations, the first block code protects the most important vocoder data bits, and linking the remaining block codes to the first block code enhances the ability to detect bit errors in the first block code.

The techniques provide an FEC encoder and decoder for encoding and decoding FEC block codes, respectively, such that subsequent block codes are linked to the first block code via data dependent modulation. The decoder analyzes a large number of possible bit patterns for the first block code to find a bit pattern that produces the smallest distance for a frame (e.g., a voice bit stream with a duration of 20 milliseconds), instead of the smallest distance for each individual block code.

The FEC decoder provided by the techniques has a greater capability of correcting errors in the first block code. The block codes subsequent to the first block code are linked to the first block code via data dependent modulation, and the first block code is effectively strengthened by taking advantage of redundancy introduced by the modulation technique. The data bits of the first block code form a seed for the modulator. The data bits of the first block code can be decoded by finding a modulator seed that minimizes the distance when the remaining block codes are decoded. The modulated block codes (the remaining block codes) are demodulated prior to decoding. If the modulator seed does not match the transmitted seed value, it will result in a larger distance. Searching for a modulator seed that produces a minimal distance when the demodulated block codes are decoded is a way of decoding the seed, and hence a way of decoding the data bits of the first block code. By combining distances produced by decoding the first block code with the distances from the remaining block codes, the decoder can find a modulator seed that produces the smallest total distance.

Instead of using the modulation technique to cause more errors in the subsequent block codes such that errors in the first block code are more detectable, the techniques of this disclosure use the modulation technique to make errors in the first block code more correctable.

The FEC decoder provided by the techniques can flip (e.g., change a value of) every combination of the $N_f$ least confident bits (i.e., the bits least likely to be transmitted correctly) of the first block code to correct bit errors. Thus, the improved decoder can correct significantly more than three bit errors (in contrast to a Golay code that can correct all combinations of three or fewer bit errors) in the first block code.

FIG. 1 shows a speech coder or vocoder system 100 that samples analog speech from a microphone 105. An analog-to-digital ("A-to-D") converter 110 digitizes the sampled speech to produce a digital speech signal. The digital speech is processed by an MBE speech encoder 115, including an FEC encoder, to produce a digital bit stream 120 suitable for transmission or storage. The speech encoder 115 processes the digital speech signal in short frames. Each frame of digital speech samples produces a corresponding frame of bits in the bit stream output of the encoder.

FIG. 1 also depicts a received bit stream 140 entering an MBE speech decoder 145 that includes an FEC decoder and processes each frame of bits to produce a corresponding frame of synthesized speech samples. A digital-to-analog ("D-to-A") converter 150 then converts the digital speech samples to an analog signal that can be passed to a speaker 155 for conversion into an acoustic signal suitable for human listening.

Figure 2:
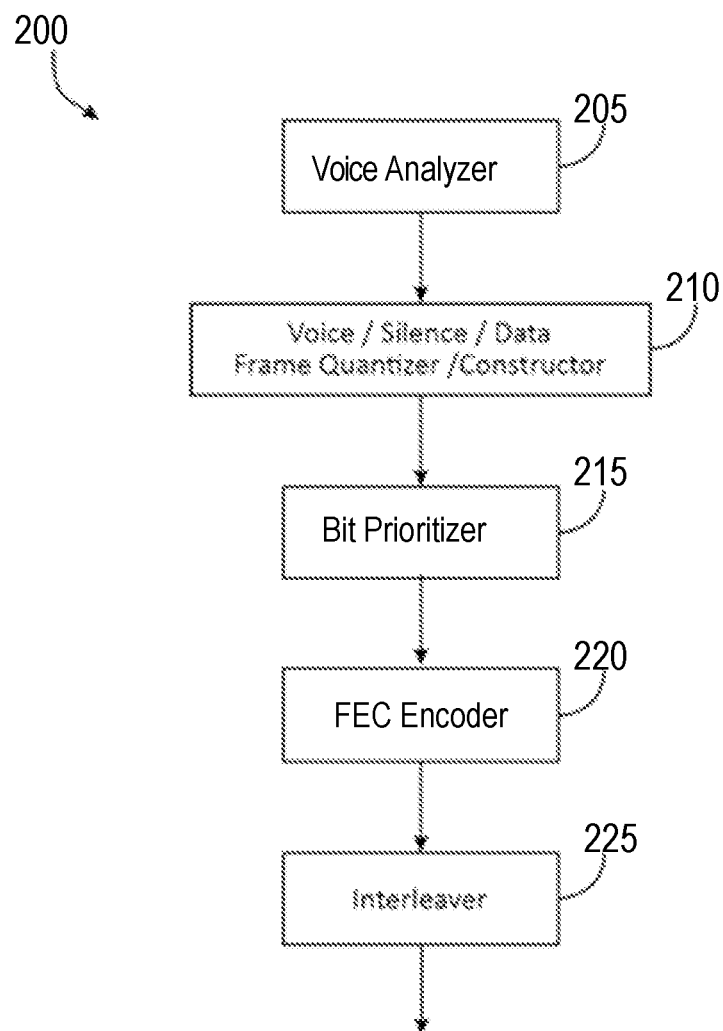
FIG. 2 is a flow chart of an encoding process.

Referring to FIG. 2, an encoder, such as MBE encoder 115 of FIG. 1, operates according to a process 200. The encoder includes a voice analyzer 205 that performs voice analysis to convert an incoming speech signal into MBE model parameters. A voice/silence/data frame quantizer/constructor 210 produces a voice, silence, or data frame.

A Bit Prioritizer 215 performs bit prioritization on the produced voice, silence, or data frame to prioritize the most important bits in the frame for transmission or storage. The frame is divided into several groups of bits, with each group assigned a priority level based on its importance. Different encoding techniques may be applied to different groups, depending on their priority levels.

Next, an FEC encoder 220 performs FEC encoding to add redundancy to the frame in order to facilitate error correction within a subsequent FEC decoder. In particular, the FEC encoder 220 generates modulation vectors from a pseudo-random sequence having a seed derived from the first block code, and the modulation vectors are used to modulate the bits of the remaining block codes. The modulation technique is described in Project 25 Vocoder Description TIA-102.BABA-A, which is incorporated herein by reference.

Next, an interleaver 225 is used to disperse error bursts when transmitting the encoded frame in a transmitted bit stream (e.g., bit stream 120 of FIG. 1). The interleaver 225 rearranges the order of the encoded frame to spread out any errors that may occur during the transmission of the frame, so that the errors are not concentrated in one part of the frame. The frame (e.g., bit stream 120 of FIG. 1) is then ready for transmission.

Figure 3:
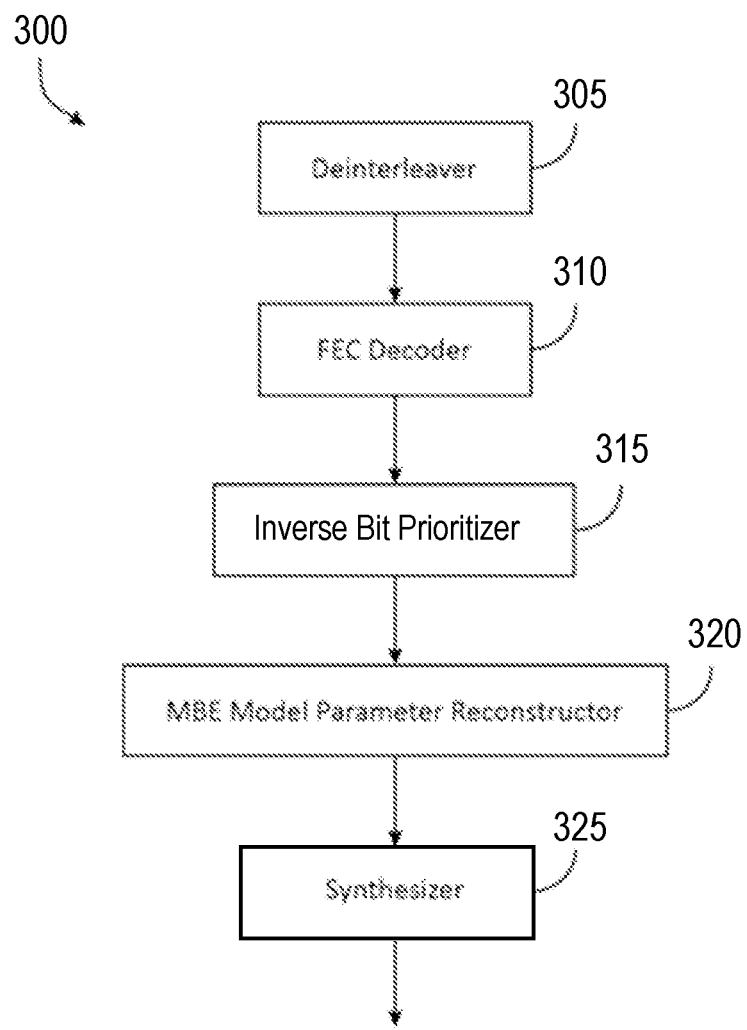
FIG. 3 is a flow chart of a decoding process.

Referring to FIG. 3, a decoder, such as the MBE decoder 145 of FIG. 1, operates according to the example process 300. The decoder includes an FEC decoder and is used in a communication system (e.g., a vocoder) where channel degradation is possible for the purpose of detecting and correcting channel errors. Initially, upon receiving a frame of bits, such as the received bit stream 140 of FIG. 1, the decoder employs a deinterleaver 305 to reverse the effects of the interleaver 225 on the received frame of bits. Next, the frame of bits is passed into an FEC decoder 310, which detects and corrects bit errors. After FEC decoding, the frame of bits is passed to an inverse bit prioritizer 315, which allocates bits based on priority levels. An MBE model parameter reconstructor 320 then is used to generate MBE model parameters from the frame of bits. Finally, a synthesizer 325 is used to generate a speech signal from the MBE model parameters.

Figure 4:
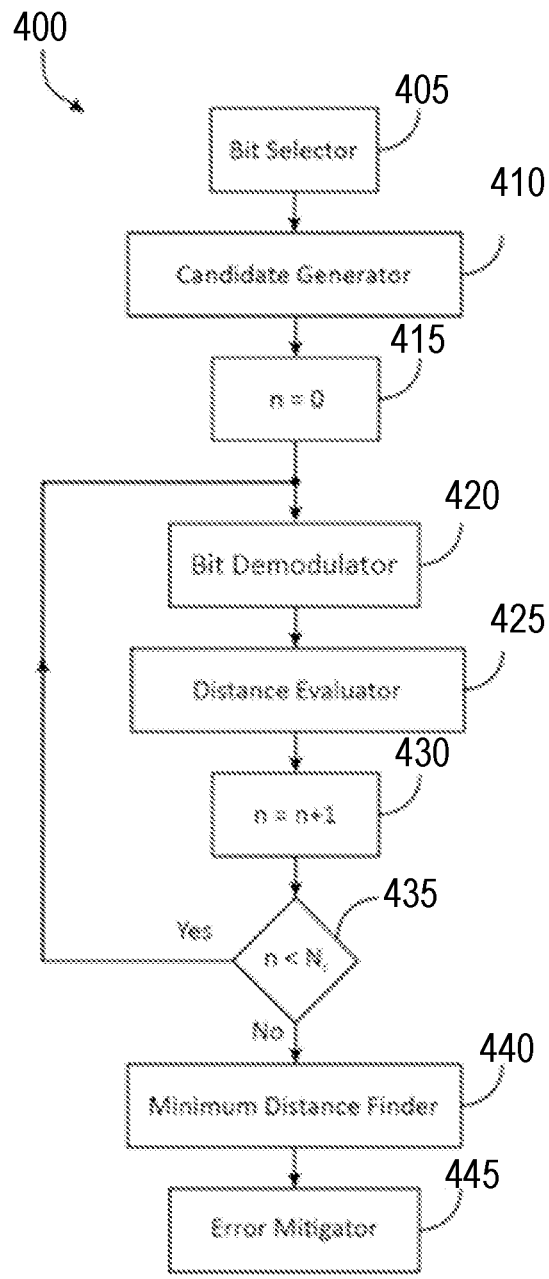
FIG. 4 is a flow chart of an error control process.

Referring to FIG. 4, an FEC decoder, such as the FEC decoder 310 of FIG. 3 operates according to a process 400. Referring also to FIG. 3, the FEC decoder 310 receives a frame of bits which are output from a deinterleaver 305. The frame of bits is separated into a plurality of vectors representing block codes. The block codes may be any combination of Golay codes and Hamming codes. The first block code is used to modulate the remaining block codes.

The FEC decoder begins execution of the process 400 by using a bit selector 405 to find the $N_f$ least confident bits of the first block code. The FEC decoder continues the execution of process 400 by using candidate generator 410 to produce $2^{N_f}$ candidates for the first block code. The $2^{N_f}$ candidates are generated by flipping (changing the value of) all combinations of the $N_f$ least confident bits identified by the bit selector 405. Also, the candidate generator 410 decodes each of the candidates and removes candidates that are not unique (the same as another candidate), resulting in $N_c < 2^{N_f}$ candidates to be evaluated.

Next, a candidate counter (e.g., n) is set to zero to initiate a process for evaluating the $N_c$ candidates (415). For example, for the first candidate, a bit demodulator 420 reverses or demodulates the modulation (the block codes were modulated in an encoder, e.g., MBE encoder 115 of FIG. 1) in the remaining block codes. The modulation sequence is a series of bits generated by a pseudo-random number generator that has been seeded by the data bits of the first block code. The encoder (e.g., MBE encoder 115 of FIG. 1) uses the modulation sequence to modulate block codes.

After demodulating the remaining block codes, the FEC decoder continues execution of the process 400 by using a distance evaluator 425 to compute a distance, for each block code, between the received bits (for the first block code) and the demodulated bits (for the remaining block codes) and each of the possible block code outputs. Each of the $N_c$ candidates is a possible output for the first block code, and 4096 possible Golay code vectors or 2048 possible Hamming code vectors are possible outputs for each remaining block code. The distance evaluator 425 decodes each block code to generate a distance for each block code and then sums the distances associated with each of the block codes to generate a total distance for the frame.

Next, the candidate counter (n) is incremented (430) and, if the candidate counter (n) is less than $N_c$ (435), operations of the block bit demodulator 420 and the block distance evaluator 425 are repeated for the next candidate (n=n+1), with operations of the block bit demodulator 420 and the block distance evaluator 425 continuing for each of the $N_c$ candidates.

After a distance has been computed for each candidate, the FEC decoder continues execution of the process 400 by using the minimum distance finder 440 to determine which of the $N_c$ candidates has the smallest total distance for the received frame of bits, and output the bit vector corresponding to the determined candidate (the best candidate). In addition, the minimum distance finder 440 can identify the distance associated with the second-best candidate (the candidate having the second smallest total distance). The difference between the smallest total distance and the second smallest total distance is used as a confidence measure.

The FEC decoder then continues the execution of process 400 by using the error mitigator 445 to analyze the distance measure, confidence measure, and total errors measure, and uses these measures to make a decision on which frames are corrupted and require mitigation such as frame repeats or frame mutes.

The error control process of FIG. 4 can be implemented in any FEC decoder, such as the Project 25 full-rate FEC decoder or the Project 25 half-rate FEC decoder.

Decoding Linked Block Codes within the Project 25 Full-Rate FEC Decoder

The process 400 may be used in decoding linked block codes within the Project 25 full-rate decoder.

Project 25 Full-Rate Error Control Encoder Review

According to the Project 25 Vocoder Description TIA-102.BABA-A, a gross bit rate of the Full-Rate Vocoder is 7200 bps. The Full-Rate digital representation combines 4400 bps for voice information with 2800 bps for redundant error control information. In each 20 ms frame (a frame with a duration of 20 ms), there are 88 voice information bits and 56 error control bits. The error control bits include four [23,12] Golay codes and three [15,11] Hamming codes (4*(23-12)+3*(15-11)=56). 81 of the 88 voice information bits are error control coded (protected by error control bits), while the last 7 bits are not error control coded (not protected by error control bits).

Error control coding in the encoder (e.g., MBE encoder 115 of FIG. 1) starts by taking four 12-bit vectors named $\hat{u}_0$ through $\hat{u}_3$ and applying [23,12] Golay codes to them to produce 23-bit vectors named $\hat{v}_0$ through $\hat{v}_3$. Next, [15,11] Hamming codes are applied to three 11-bit vectors named $\hat{u}_4$ through as to produce 15-bit vectors named $\hat{v}_4$ through $\hat{v}_6$. Then the last 7-bit source vector $\hat{u}_7$ is passed directly to the vector $\hat{v}_7$ without adding any error control bits. Next, modulation vectors, $\hat{m}_0$ through $\hat{m}_7$, are computed as described in Section 7.4 of Project 25 Vocoder Description TIA-102.BABA-A. The modulation vectors are added (modulo 2) to $\hat{v}_0$ through $\hat{v}_7$ to produce modulated output vectors $\hat{c}_0$ through $\hat{c}_7$. The modulation "links" block codes 1-6 ($\hat{c}_1$ through $\hat{c}_6$) to block code 0 ($\hat{c}_0$), because the modulation vectors (a modulation sequence is a combination of all the modulation vectors) are generated by a pseudo-random number generator which has been seeded by the data bits of the first block code. Finally, the bits in $\hat{c}_0$ through $\hat{c}_7$ are combined together and rearranged by an interleaver (e.g., interleaver 225 of FIG. 2), as described in Section 7.5 of the Project 25 Vocoder Description TIA-102.BABA-A, for data transmission.

Project 25 Full-Rate Error Control Decoder

The modulation applied in the encoder "links" block codes 1-6 to block code 0 (the first block code). As discussed in section 7.4 of Project 25 Vocoder Description TIA-102.BABA-A, this can cause errors in block code 0 to propagate into increased errors in the remaining block codes. But the error control decoder (an FEC decoder) can use the "linked" block codes in a different way such that block code 0 gains correcting strength because it has been linked to the remaining block codes.

Deinterleaver

The full-rate error control decoder begins execution by deinterleaving the received bits. The deinterleaver (e.g., deinterleaver 305 of FIG. 3) reverses the bit arrangement performed by the interleaver (e.g., interleaver 225 of FIG. 2) to obtain bit vectors $c^0$ through $c^7$. These vectors $c^0$ through C are distinguished from the vectors $\hat{c}_0$ through $\hat{c}_7$ produced in the error control encoder, because $c^0$ through $c^7$ may contain bit errors resulting from the transmission channel.

Soft/Hard-decision Format

The error control decoder may receive a frame of bits in either hard-decision format or soft-decision format. Soft-decision format typically has a greater error correction potential.

Notation $\hat{c}_j^n$ (a superscript denotes a block code, and a subscript denotes a bit within the block code) refers to bit j within $c^n$. For example, 23 bits within a block code (bit vector) $c^0$ of a half-rate vocoder are $\hat{c}_0^0, \hat{c}_1^0 \ldots, \hat{c}_{22}^0$.

When the received bits are in hard-decision format, every received bit, $\hat{c}_j^n$, is binary and is represented with either a 0 or 1. When the received bits are in B-bit soft-decision format, every received bit, $\hat{c}_j^n$, is an integer such that $0 \leq \hat{c}_j^n < 2^B$, where 0 represents a most confident "0" bit, $2^B-1$ represents a most confident "1" bit, and a value between 0 and $2^B-1$ represents a bit received with reduced confidence. The hard-decision format is a special case of the soft decision format where B is 1.

Decoding the First Block Code

During encoding, the first block code was used to produce a modulation sequence in the encoder, and the modulation sequence was applied to the subsequent block codes. Thus, the first block code is decoded first, so that the modulation on the remaining block codes can be reversed. Due to the modulation technique, all of the subsequent block codes are likely to detect errors if the first block code is decoded incorrectly. In some implementations, an implementation for decoding the first block code is to produce multiple candidates for the first block code and evaluate a distance over the entire set of block codes. Each block code is decoded in a way that produces a distance between the received bits of the corresponding block code and the decoded bits of the corresponding block code. The distances are summed across all of the block codes to produce a total distance. The total distance is computed multiple times, since there are multiple candidates for the first block code and accordingly multiple candidates for the modulation sequence. Incorrect candidates for the first block code will produce a wrong modulation sequence, and the distances for the "linked" block codes will be large. If the first block code contains errors that could not normally be corrected by a Golay code (a [23,12] Golay code can correct all combinations of 3 or fewer bit errors), the technique allows for additional bit errors (up to $N_f$+3 bits in the first block code) to be corrected. The extra redundancy resulting from the modulation technique enables correction of more bit errors.

Find the Least Confident Bits in the First Block Code

Decoding the frame of bits begins by determining $N_f$ least confident bits in $c^0$, and the nominal value of $N_f$ is, e.g., 8. Lower values may reduce algorithm complexity at some cost to performance. Greater values may increase algorithm complexity with some gain in performance.

The confidence of each bit in a frame is calculated according to Equation (1) below:

$$z_j = |2c_j^0 - (2^B - 1)| \text{ for } 0 \leq j < 23 \quad (1)$$

After computing the confidence of each bit, the $N_f$ bits with the lowest confidence are identified. In the case of a tie (the same confidence), the bit with the lowest index j is selected. The indices of the $N_f$ least confident bits in $c^0$ are denoted by $J_0 \ldots J_{N_f-1}$. The lowest confidence bits are identified because they are the most likely bits to have a bit error. In some implementations, considering all bit patterns formed by flipping (changing a value of) any of the $N_f$ least confident bits or any combination of the $N_f$ least confident bits, there is a total of $2^{N_f}$ such patterns. The error control decoder can decode the received 23-bit $c^0$ and also $2^{N_f}$ closest patterns (in contrast to an ordinary Golay decoder that decodes the received 23-bit $c^0$ to find the closest possible code word that could have been transmitted). The bit pattern (candidate) with the smallest overall distance is selected.

Produce Candidates for the First Block Code

The 23-bit hard-decision vector $c^H$ is derived from the 23-bit soft-decision vector $c^0$ by integer-dividing each of the soft-decision bits by $2^{B-1}$ according to Equation (2) below. In some implementations, most processors allow this division to be performed simply by right shifting each soft-decision bit by B-1 bits.

$$c_j^H = \left\lfloor \frac{c_j^0}{2^{B-1}} \right\rfloor \text{ for } 0 \leq j < 23 \quad (2)$$

Next, $2^{N_f}$ variants are formed by flipping up to $N_f$ bits in the vector $c^H$ according to Equation (3).

$$c_j^{H,n} = \begin{cases} 1 - c_j^H & \text{if flip}(j, n) \\ c_j^H & \text{otherwise} \end{cases} \text{ for } 0 \le j < 23, 0 \le n < 2^{N_f} \quad (3)$$

Where flip(j, n) is a function that specifies which bits are to be flipped according to Equation (4).

$$\text{flip}(j, n) = \begin{cases} \text{true} & \text{if } j = J_{n_0} \text{ and } n_0 = 1 \\ \text{true} & \text{if } j = J_{n_1} \text{ and } n_1 = 1 \\ \ldots \\ \text{true} & \text{if } j = J_{n_{N_f-1}} \text{ and } n_{N_f-1} = 1 \\ \text{true} & \text{otherwise} \end{cases} \quad (4)$$

Where n is an $N_f$ bit integer and $n_{N_f-1} \ldots n_0$ represent the individual bits of n where $n_{N_f-1}$ is the most significant bit (MSB) of n, and $n_0$ is the least significant bit (LSB) of n.

Next, each of the $2^{N_f}$ candidates ($c^{H,n}$ for $0 \le n < 2^{N_f}$) for the first block code are decoded with a [23,12] Golay decoder to produce $\ddot{c}^n$ for $0 \le n < 2^{N_f}$ according to Equation (5).

$$\ddot{c}^n = \text{GolayDecode}_{23,12}(c^{H,n}) \text{ for } 0 \le n < 2^{N_f} \quad (5)$$

Multiple values for $c^{H,n}$ may decode to the same value for $\ddot{c}^n$, such that not all the values for $\ddot{c}^n$ are unique. The non-unique candidates are omitted or ignored to form a set of unique (each candidate is different) candidates $\dot{c}^n$ for $0 \le n < N_c$, where $N_c \le 2^{N_f}$.

Evaluating Each of the Candidates for the First Block Code

To evaluate each of the candidates for the first block code, a distance for each candidate is computed according to Equation (6).

$$D_{0,n} = |c^0 - (2^B - 1) \cdot \dot{c}^n| \cdot s^{23} \text{ for } 0 \le n < N_c \quad (6)$$

Where
1. $c^0$ is, e.g., a row vector of length 23 containing the soft-decision bits for the first block code.
2. Each value for $\dot{c}^n$ is, e.g., a row vector of length 23 containing binary (hard-decision) bits.
3. Scaling each bit in $\dot{c}^n$ by $(2^B-1)$ and computing the absolute value of the differences between the two vectors results in a new row vector of length 23.
4. $s^{23}$ is a column vector of length 23, containing all ones, such that the dot product with the vector $|c^0-(2^B-1)\cdot\dot{c}^n|$ produces a sum of the absolute values of the differences.
5. A distance, $D_{0,n}$, is computed for each of the $N_c$ candidates.

According to the Project 25 Vocoder Description TIA-102.BABA-A, a modulation vector derived from the first block code was applied to each of the subsequent block codes in an encoder. Accordingly, to decode the remaining block codes in an error control decoder, the modulation is reversed. The modulation pattern is computed for each n ($0 \le n < N_c$) candidates. The seed, $u^n$, for each modulation sequence, is formed by dropping the 11 bits of redundancy in each candidate. The remaining 12 data bits of each candidate are packed into a 12-bit $u^n$ (the seed $u^n$ is a part of each candidate for the first block code). The modulation vectors are computed according to Equations (7), (8), and (9) for each of the $N_c$ candidates.

$$p_0^n = 16 \cdot u^n \text{ for } 0 \le n < N_c \quad (7)$$

$$p_j^n = (173 p_{j-1}^n + 13849) \bmod 65536 \text{ for } 1 \le j < 115, 0 \le n < N_c \quad (8)$$

$$m_{j-1}^n = \left\lfloor \frac{p_j^n}{32768} \right\rfloor \text{ for } 1 \le j < 115, 0 \le n < N_c \quad (9)$$

The 114 bits of modulation (modulation sequence or modulation vector) are applied to the remaining 3 [23,12] Golay Code vectors and 3 [15,11] Hamming code vectors (3*23+3*15=114). For each n candidate, the remaining block codes are demodulated and stored in vectors $v^{1,n}$ through $v^{6,n}$. Note that each received vector $c^i$ for $1 \le i \le 6$ contains bits in soft-decision format. In some implementations, modulation of these vectors may require that bits that are flipped keep the same confidence.

Compute distances for the Second Block Code

Next, $v^{1,n}$ is Golay decoded by applying Equations (10) and (11) to evaluate the distance between each of $2^{12}=4096$ possible transmitted vectors and the demodulated vector $v^{1,n}$.

$$d_{1,k,n} = |v^{1,n} - (2^B - 1) \cdot t^{12,k} \cdot G^{23,12}| \cdot s^{23} \text{ for } 0 \le k < 4096, 0 \le n < N_c \quad (10)$$

$$D_{1,n} = \min_k d_{1,k,n} \quad (11)$$

Note that $t^{12,k}$ is a 12-bit row vector containing all ones and zeros. It represents 4096 possible Golay code vectors that could have been transmitted from an encoder. A distance is computed for each k.

$t^{12,0}$=[0 0 0 0 0 0 0 0 0 0 0 0]

$t^{12,1}$=[0 0 0 0 0 0 0 0 0 0 0 1]

$t^{12,2}$=[0 0 0 0 0 0 0 0 0 0 1 0]

$t^{12,3}$=[0 0 0 0 0 0 0 0 0 0 1 1]

. . .

$t^{12,4095}$ [1 1 1 1 1 1 1 1 1 1 1 1]

$G^{23,12}$ is the following 23×12 Golay code generator matrix which is used to compute [23×12] Golay codes.

$$G^{23,12} = \begin{bmatrix} 1 & 0 & 0 & 0 & 0 & 0 & 0 & 0 & 0 & 0 & 0 & 0 & 1 & 1 & 0 & 0 & 0 & 1 & 1 & 1 & 0 & 1 & 0 \\ 0 & 1 & 0 & 0 & 0 & 0 & 0 & 0 & 0 & 0 & 0 & 0 & 1 & 1 & 0 & 0 & 0 & 1 & 1 & 1 & 0 & 1 \\ 0 & 0 & 1 & 0 & 0 & 0 & 0 & 0 & 0 & 0 & 0 & 0 & 1 & 1 & 1 & 1 & 0 & 1 & 1 & 0 & 1 & 0 & 0 \\ 0 & 0 & 0 & 1 & 0 & 0 & 0 & 0 & 0 & 0 & 0 & 0 & 1 & 1 & 1 & 1 & 0 & 1 & 1 & 0 & 1 & 0 \\ 0 & 0 & 0 & 0 & 1 & 0 & 0 & 0 & 0 & 0 & 0 & 0 & 1 & 1 & 1 & 1 & 0 & 1 & 1 & 0 & 1 \\ 0 & 0 & 0 & 0 & 0 & 1 & 0 & 0 & 0 & 0 & 0 & 0 & 1 & 1 & 0 & 1 & 1 & 0 & 0 & 1 & 1 & 0 & 0 \\ 0 & 0 & 0 & 0 & 0 & 0 & 1 & 0 & 0 & 0 & 0 & 0 & 0 & 1 & 1 & 0 & 1 & 1 & 0 & 0 & 1 & 1 & 0 \\ 0 & 0 & 0 & 0 & 0 & 0 & 0 & 1 & 0 & 0 & 0 & 0 & 0 & 0 & 1 & 1 & 0 & 1 & 1 & 0 & 0 & 1 & 1 \\ 0 & 0 & 0 & 0 & 0 & 0 & 0 & 0 & 1 & 0 & 0 & 0 & 1 & 1 & 0 & 1 & 1 & 1 & 0 & 0 & 0 & 1 & 1 \\ 0 & 0 & 0 & 0 & 0 & 0 & 0 & 0 & 0 & 1 & 0 & 0 & 1 & 0 & 0 & 1 & 0 & 1 & 0 & 0 & 1 & 0 & 1 & 1 \\ 0 & 0 & 0 & 0 & 0 & 0 & 0 & 0 & 0 & 0 & 1 & 0 & 1 & 0 & 1 & 0 & 0 & 1 & 0 & 0 & 1 & 1 & 1 & 1 \\ 0 & 0 & 0 & 0 & 0 & 0 & 0 & 0 & 0 & 0 & 0 & 1 & 1 & 0 & 0 & 0 & 1 & 1 & 1 & 0 & 1 & 0 & 1 \end{bmatrix}$$

The product, $t^{12,k} \cdot G^{23,12}$, evaluates to a row vector representing one of the 4096 possible Golay code vectors that might have been transmitted. The product is computed using modulo-2 math, such that the resulting product contains only ones and zeros. In some implementations, this table of products can be pre-tabulated in the decoder to save computations in the decoder. Scaling the product by $(2^B-1)$ converts the product to the same scale as that of the demodulated input vector of soft-decision bits, $v^{1,n}$. After scaling, all elements of the vector are either 0 (most confident "0") or $(2^B-1)$ (most confident "1"). The absolute value of a difference between the two row vectors produces a distance component for each bit. Note that the absolute value of the difference is also a row vector. $s^{23}$ is a column vector containing all ones. Multiplication of the row vector (the absolute value of the difference) by this column vector results in summing all of the values in the row vector to obtain the distance. For each of the $N_c$ candidates, $d_{1,k,n}$ is computed for all 4096 of the possible values of k. Then the minimum distance over all k, $D_{1,n}$, is found. The value of k that produces the minimum distance is the nth candidate for the Golay decoder. Equation (10) that computes $d_{1,k,n}$ combined with Equation (11) that computes $D_{1,n}$ are a particular implementation of a [23, 12] Golay decoder. This implementation is well suited to soft-decision decoding. The Equations (10) and (11) yield the closest Golay code relative to the received bit vector, and in addition the distance between the chosen Golay code and the received bit vector.

Next, the distances for the other five block codes ($v^{2,n}$ through $v^{6,n}$) are computed in a similar fashion using the following series of equations (Equations (12) to (21)).

$$d_{2,k,n} = \left| v^{2,n} - (2^B - 1) \cdot t^{12,k} \cdot G^{23,12} \right| \cdot s^{23} \quad \text{for } 0 \leq k < 4096, 0 \leq n < N_c \quad (12)$$

$$D_{2,n} = \min_k d_{2,k,n} \quad \text{for } 0 \leq n < N_c \quad (13)$$

$$d_{3,k,n} = \left| v^{3,n} - (2^B - 1) \cdot t^{12,k} \cdot G^{23,12} \right| \cdot s^{23} \quad \text{for } 0 \leq k < 4096, 0 \leq n < N_c \quad (14)$$

$$D_{3,n} = \min_k d_{3,k,n} \quad \text{for } 0 \leq n < N_c \quad (15)$$

$$d_{4,k,n} = \left| v^{4,n} - (2^B - 1) \cdot t^{11,k} \cdot H^{15,11} \right| \cdot s^{15} \quad \text{for } 0 \leq k < 2048, 0 \leq n < N_c \quad (16)$$

$$D_{4,n} = \min_k d_{4,k,n} \quad \text{for } 0 \leq n < N_c \quad (17)$$

$$d_{5,k,n} = \left| v^{5,n} - (2^B - 1) \cdot t^{11,k} \cdot H^{15,11} \right| \cdot s^{15} \quad \text{for } 0 \leq k < 2048, 0 \leq n < N_c \quad (18)$$

$$D_{5,n} = \min_k d_{5,k,n} \quad \text{for } 0 \leq n < N_c \quad (19)$$

$$d_{6,k,n} = \left| v^{6,n} - (2^B - 1) \cdot t^{11,k} \cdot H^{15,11} \right| \cdot s^{15} \quad \text{for } 0 \leq k < 2048, 0 \leq n < N_c \quad (20)$$

$$D_{6,n} = \min_k d_{6,k,n} \quad \text{for } 0 \leq n < N_c \quad (21)$$

The equations (Equations (12)-(21)) implement two additional [24,12] Golay decoders and three [15,11] Hamming decoders. Where $t^{11,k}$ is a row vector, similar to $t^{12,k}$, represents all $2^{11}=2048$ possible transmitted values for each of the Hamming codes. $s^{15}$ is a column vector containing 15 ones and $H^{15,11}$ is the following Hamming code generator matrix:

$$H^{15,11} = \begin{bmatrix} 1 & 0 & 0 & 0 & 0 & 0 & 0 & 0 & 0 & 0 & 0 & 1 & 1 & 1 & 1 \\ 0 & 1 & 0 & 0 & 0 & 0 & 0 & 0 & 0 & 0 & 0 & 1 & 1 & 1 & 0 \\ 0 & 0 & 1 & 0 & 0 & 0 & 0 & 0 & 0 & 0 & 0 & 1 & 1 & 0 & 1 \\ 0 & 0 & 0 & 1 & 0 & 0 & 0 & 0 & 0 & 0 & 0 & 1 & 1 & 0 & 0 \\ 0 & 0 & 0 & 0 & 1 & 0 & 0 & 0 & 0 & 0 & 0 & 1 & 0 & 1 & 1 \\ 0 & 0 & 0 & 0 & 0 & 1 & 0 & 0 & 0 & 0 & 0 & 1 & 0 & 1 & 0 \\ 0 & 0 & 0 & 0 & 0 & 0 & 1 & 0 & 0 & 0 & 0 & 1 & 0 & 0 & 1 \\ 0 & 0 & 0 & 0 & 0 & 0 & 0 & 1 & 0 & 0 & 0 & 0 & 1 & 1 & 1 \\ 0 & 0 & 0 & 0 & 0 & 0 & 0 & 0 & 1 & 0 & 0 & 0 & 1 & 1 & 0 \\ 0 & 0 & 0 & 0 & 0 & 0 & 0 & 0 & 0 & 1 & 0 & 0 & 1 & 0 & 1 \\ 0 & 0 & 0 & 0 & 0 & 0 & 0 & 0 & 0 & 0 & 1 & 0 & 0 & 1 & 1 \end{bmatrix}$$

For each n candidate, the minimum distances from each of the block codes are summed to produce a total distance $D_{T,n}$, according to Equation (22).

$$D_{T,n} = D_{0,n} + D_{1,n} + D_{2,n} + D_{3,n} + D_{4,n} + D_{5,n} + D_{6,n} \quad (22)$$

The total distance is computed for each of the $N_c$ candidates, and then a candidate that produces the smallest total distance across all of the block codes is determined according to Equation (23). This candidate is taken as the most likely transmitted code for the first block code $c^0$.

$$D = \min_n D_{T,n} \quad (23)$$

Note that when an incorrect candidate for the first block code is evaluated, typically $D_{1,n}$ through $D_{6,n}$ are large, because the incorrect candidate results in an incorrect modulation sequence. A typical Golay decoder algorithm would always choose a code (Golay code or Hamming code) that results in the minimum distance for the first block code. The techniques in this disclosure may choose a code for the first block code that minimizes D, instead of minimizing $D_{0,n}$. The k value associated with each of the remaining block codes that produced $D_{1,n}$ through $D_{6,n}$ are used to form the best decoding for the frame of bits.

Note that for each value of k:
1. k itself is a 12-bit integer for Golay codes or an 11-bit integer for Hamming codes. The bits represent the uncoded bits.

2. Vector $t^{12,k}$ or $t^{11,k}$ represents the individual bits of k as a vector of ones and zeros.
3. $t^{12,k} \cdot G^{23,12}$ represents the [23,12] Golay code for input $t^{12}$,k
4. $t^{11,k} \cdot H^{15,11}$ represents the [25,11] Hamming code for input $t^{11,k}$.

After selecting the value of k that produces the minimum distance for each of the remaining block codes $v^{1,n}$ through $v^{6,n}$, the corresponding block code $t^{12,k} \cdot G^{23,12}$ or $t^{11,k} \cdot H^{15,11}$ can be taken as the most likely transmitted code for each of the remaining block codes $v^{1,n}$ through $v^{6,n}$.

In addition to the total distance for the frame, another metric for assessing the quality of the decoded frame is the difference between the smallest total distance and the second smallest total distance. The difference between the smallest total distance and the second smallest total distance is called "confidence" and is assigned variable C. In some implementations, when there are no bit errors, the distance between two candidates for a Golay code is, e.g., at least 7 bits, due to the minimum distance property of Golay codes. When channel conditions become degraded, the confidence may become smaller (e.g., less than 7 bits). Both the distance D and the confidence C are used to assess the quality of the decoded frame. The distance and confidence are each normalized utilizing the following two equations to produce a normalized distance, $D_n$, and a normalized confidence, $C_n$.

$$D_n = \frac{D}{2^{B+1}}$$

$$C_n = \frac{2C}{2^B}$$

Figure 5:
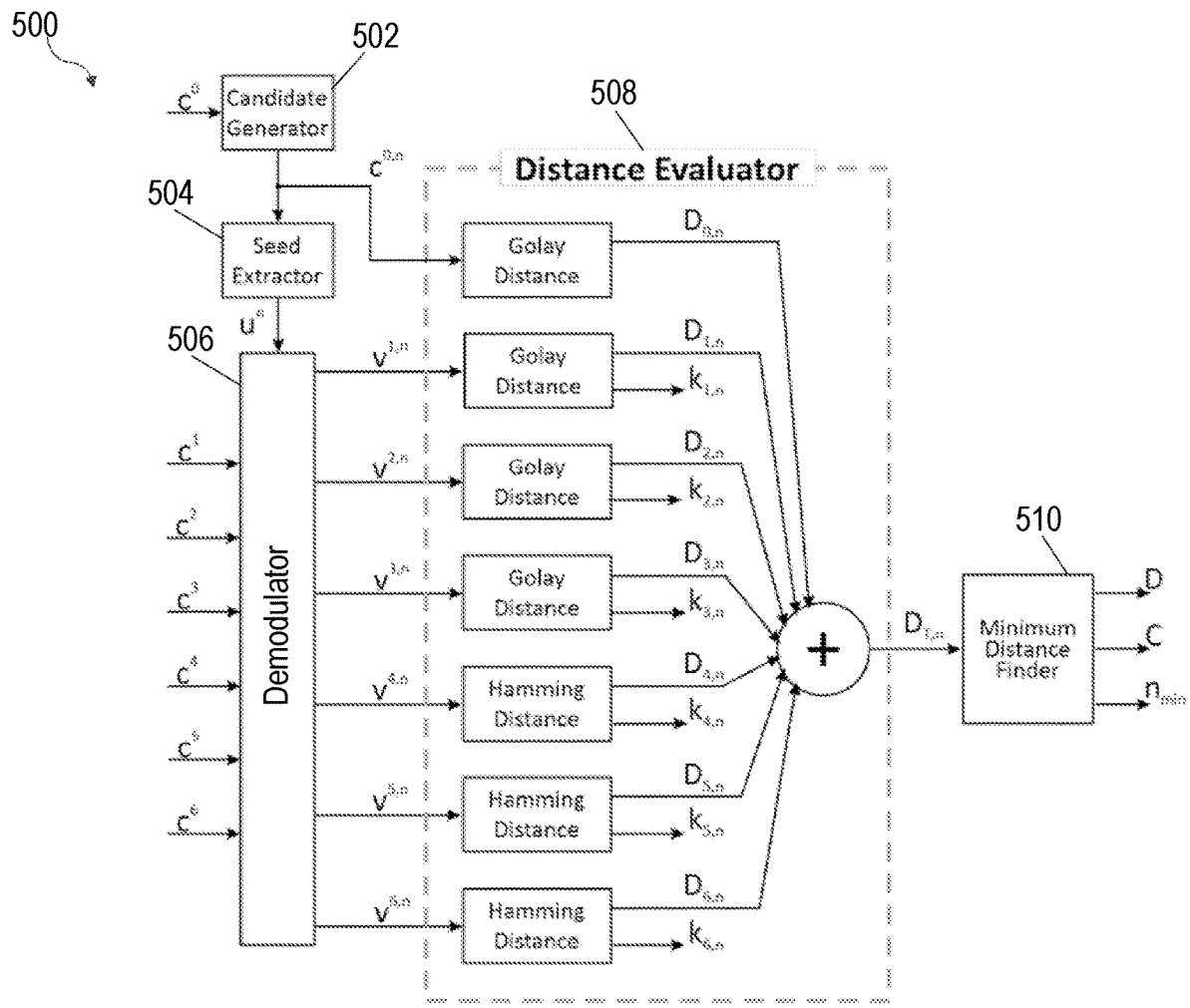
FIG. 5 is a block diagram of an FEC decoder.

FIG. 5 shows a block diagram 500 of a Project 25 full-rate FEC decoder (e.g., FEC decoder 310 of FIG. 3). The first block code $c^0$ is input into candidate generator 502, which outputs candidates $c^{0,n}$ ($0 \leq n < 2^{N_f}$) for the first block code. Each candidate $c^{0,n}$ is input into seed extractor 504, which outputs a seed $u^n$ for demodulating the remaining block codes $c^1$ to $c^6$. In some implementations, the seed $u^n$, for each modulation sequence, is formed by dropping the 11 bits of redundancy in each candidate. The remaining 12 data bits of each candidate are packed into a 12-bit $u^n$. The modulation vectors $m^{1,n}$ through $m^{6,n}$ are calculated based on the seed $u^n$. The remaining block codes $c^1$ to $c^6$ are demodulated by demodulator 506. The demodulator 506 applies the modulation vectors $m_1$ through $m_6$ to the remaining block codes $c^1$ to $c^6$ to obtain demodulated vectors $v^{1,n}$ through $v^{6,n}$. The candidate $c^{0,n}$ for the first block code and the demodulated vectors $v^{1,n}$ through $v^{6,n}$ for the remaining block codes are input into distance evaluator 508, which outputs a total distance $D_{T,n}$ across all the block codes. The distance evaluator 508 calculates a distance $D_{0,n}$ (e.g., Golay distance) between the first block code $c^0$ and the Golay-decoded candidate $c^{0,n}$. The distance evaluator 508 also obtains a minimum distance ($D_{1,n}, D_{2,n}, \ldots, D_{6,n}$) between a possible transmitted vector ($t^{12,k_1,n} \cdot G^{23,12}$, $t^{12,k_2,n} \cdot G^{23,12}, \ldots, t^{12,k_1,n} \cdot G^{23,12}$) and a demodulated vector ($v^{1,n}$, $v^{2,n}, \ldots, v^{6,n}$) $D_{1,n}, D_{2,n}, \ldots, D_{6,n}$ can be Golay distance or Hamming distance. The distance evaluator 508 sums up all the calculated distances to obtain a total distance $D_{T,n}=D_{0,n}+D_{1,n}+D_{2,n}+D_{3,n}+D_{4,n}+D_{5,n}+D_{6,n}$. The minimum distance finder 510 identifies a candidate $c^{0,n}$ corresponding to the minimum total distance D. In addition to the minimum total distance D, the minimum distance finder 510 also determines confidence C (the difference between the smallest total distance and the second smallest total distance).

Error Estimation

The number of errors in each block code is computed by examining how many bits were flipped between the input bits and the decoded output bits. The total number of bits flipped in each block code is $\varepsilon_i$ for $0 \leq i \leq 6$. The sum of all of the $\varepsilon_i$ is an estimate of the total number of bit errors corrected in the current frame, ET. Also, an error rate is calculated using the approach described in the Project 25 Vocoder Description TIA-102.BABA-A.

Frame Repeats

The error metrics of each frame are analyzed to detect and discard frames that are highly corrupted. The approach is similar to what is described in the Project 25 Vocoder Description TIA-102.BABA-A, but the thresholds are adjusted to account for the improved performance of the techniques in this disclosure. For highly degraded channels, it is hard to know with certainty which frames contain errors. The thresholds used to detect an invalid frame are chosen such that most invalid frames are detected. It could be possible to detect more invalid frames, but that would be at the cost of discarding a high number of good frames.

If $\varepsilon_0 < 1$, then it is determined that no frame repeat is required. Otherwise, the frame repeat logic continues until a final decision (either "no frame repeat is required" or "a frame repeat is required") is made.

If $\varepsilon_T < 14$, then it is determined that no frame repeat is required. Otherwise, the frame repeat logic continues until a final decision (either "no frame repeat is required" or "a frame repeat is required") is made.

If $C_n > 3$, then it is determined that no frame repeat is required. Otherwise, the frame repeat logic continues until a final decision (either "no frame repeat is required" or "a frame repeat is required") is made.

If $C_n > 0$ and $D_n > 9 + C_n$, then it is determined that a frame repeat is required. Otherwise, the frame repeat logic continues until a final decision (either "no frame repeat is required" or "a frame repeat is required") is made.

If $C_n = 0$, then it is determined that a frame repeat is required. Otherwise, it is determined that no frame repeat is required.

In some implementations, a frame repeat is performed by the decoder if $C_n$ is less than a predetermined confidence measure and $\varepsilon_T$ is more than a predetermined number of bit errors. For example, a frame repeat may be performed by the decoder if both of the following two conditions are met: $C_n \leq 1$ and $\varepsilon_T \geq 12$ or if both of the following two conditions are met: $C_n \leq 4$ and $\varepsilon_T \geq 13$. Otherwise, no frame repeat is performed.

Decoding Linked Block Codes within the Project 25 Half-Rate FEC Decoder

In some implementations, an example process for decoding linked block codes within the Project 25 Half-Rate Decoder is provided. APCO Project 25 Half-Rate Vocoder Addendum TIA-102.BABA-1 is incorporated herein by reference.

Project 25 Half-Rate Error Control Encoder Review

According to the APCO Project 25 Half-Rate Vocoder Addendum TIA-102.BABA-1, a gross bit rate of the Half-Rate Vocoder is 3600 bps. The Half-Rate digital representation combines 2450 bps for voice information with 1150 bps for redundant error control information. In each 20 ms frame, there are 49 voice information bits and 23 error control bits. The error control bits include a [24,12] Golay code and a [23,12] Golay code (1*(24-12)+1*(23-12)=23).

24 of the voice information bits are protected by error control, and the last 25 bits are not error control coded.

Error control coding in the encoder (e.g., MBE encoder 115 of FIG. 1) starts by taking a 12-bit vector named $\hat{u}_0$ and applying a [24,12] Golay code to produce a 24-bit vector named $\hat{v}_0$. Next, a [23,12] Golay code is applied to the 12-bit vector named $\hat{u}_1$ to produce a 23-bit vector named $\hat{v}_1$. Vector $\hat{v}_1$ is modulated according to the APCO Project 25 Half-Rate Vocoder Addendum TIA-102.BABA-1, and the resulting modulated vector is named $\hat{c}_1$. The vector $\hat{v}_0$ is not modulated and can be passed directly to the vector $\hat{c}_0$. Then the last 11-bit and 14-bit source vectors, $\hat{u}_2$ and $\hat{u}_3$ are passed directly to vectors $\hat{c}_2$ and $\hat{c}_3$ without adding any error control. Finally, the bits in $\hat{c}_0$-$\hat{c}_3$ are combined together and rearranged by an interleaver (e.g., interleaver 225 of FIG. 2), as described in Section 5.4 of the APCO Project 25 Half-Rate Vocoder Addendum TIA-102.BABA-1, for data transmission.

Project 25 Half-Rate Error Control Decoder

The second block code (vector $\hat{v}_1$) is linked to the first block code (vector $\hat{v}_0$) by the modulation technique in the same way as has been described in the description for the Full-Rate Error Control Decoder and elsewhere. The second block code is used to strengthen the first block code in a similar fashion.

The half-rate error control decoder begins execution by deinterleaving the received bits. The deinterleaver (e.g., deinterleaver 305 of FIG. 3) reverses the bit arrangement performed by the interleaver (e.g., interleaver 225 of FIG. 2) to obtain bit vectors $c^0$ through $c^3$. These vectors are distinguished from the vectors $\hat{c}_0$ through $\hat{c}_3$ produced in the error control encoder, because they may contain bit errors resulting from the transmission channel. The bits in $c^4$ through $c^3$ may be in either hard-decision format or soft-decision format.

The half-rate error control decoder operates in a similar fashion to the full-rate error control decoder, except that the half-rate error control decoder is simpler since only two block codes are used. Decoding the frame of bits begins by determining the $N_f$ least confident bits in $c^0$. Next, $2^{N_f}$ candidates are formed by flipping all combinations of the $N_f$ least confident bits and passing the resulting candidates through a [24,12] Golay decoder. The non-unique Golay codes are omitted to form a set of unique candidates, $\hat{c}^n$ for $0 \le n < N_c$, where $N_c$ $2^{N_f}$. The distance between each of the $N_c$ candidates and $c^0$ is computed according to Equation (24).

$$D_{0,n} = |c^0 - (2^B - 1) \cdot \hat{c}^n| \cdot s^{24} \text{ for } 0 \le n < N_c \quad (24)$$

where column vector, $s^{24}$, has a length of 24 and contains all ones. In a similar fashion as described previously for the full-rate error control decoder, the single remaining block code is demodulated for each of the $N_c$ candidates in $\hat{c}^n$. After reversing the modulation for each candidate, there are $N_c$ candidates for the demodulated vector $v^{1,n}$. Each candidate for $v^{1,n}$ is Golay decoded by applying Equations (25) and (26) to evaluate the distance between each of $2^{12}$=4096 possible transmitted Golay code vectors and each candidate for the demodulated received vector. A candidate for $v^{1,n}$ with the minimum distance $D_{1,n}$ is identified.

$$d_{1,k,n} = |v^{1,n} - (2^B - 1) \cdot t^{12,k} \cdot G^{23,12}| \cdot s^{23} \text{ for } 0 \le k < 4096, 0 \le n < N_c \quad (25)$$

$$D_{1,n} = \min_k d_{1,k,n} \quad (26)$$

Next, the total distance for the frame is computed according to Equation (27), and then a candidate that has the minimum total distance across all of the block codes is obtained according to Equation (28).

$$D_{T,n} = D_{0,n} + D_{1,n} \quad (27)$$

$$D = \min_n D_{T,n} \quad (28)$$

The total distance is computed for each of the $N_c$ candidates, and then the candidate for the first block code that produces the smallest total distance across both of the block codes is determined. The error control decoder takes the set of vectors that had the smallest total distance as the most likely transmitted bit vectors. Similarly to the full-rate error control decoder, the confidence C is the difference between the smallest total distance and the second smallest total distance. Also, D and C are normalized using the same equations specified for the full-rate error control decoder to produce $D_a$ and $C_n$.

Figure 6:
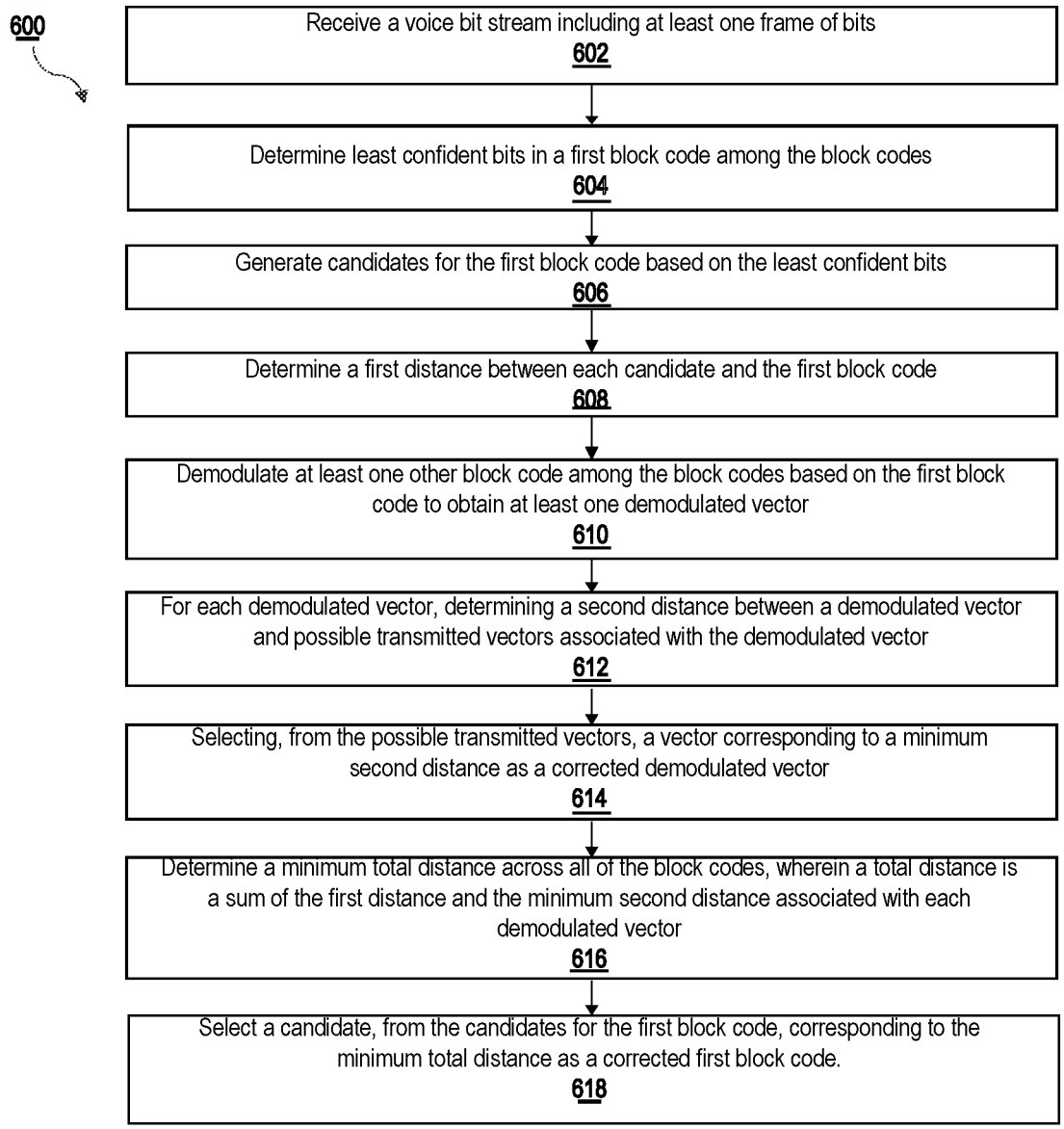
FIG. 6 is a flow chart of another error control process.

FIG. 6 is a flow chart of another error control process 600. The process 600 is performed by an FEC decoder, such as FEC decoder 310 of FIG. 3. In some implementations, the process 600 shown in FIG. 6 can be modified or reconfigured to include additional, fewer, or different operations, which can be performed in the order shown or in a different order. In some instances, one or more of the operations can be repeated or iterated, for example, until a terminating condition is reached. In some implementations, one or more of the individual operations shown in FIG. 6 can be executed as multiple separate operations, or one or more subsets of the operations shown in FIG. 6 can be combined and executed as a single operation.

The FEC decoder begins execution of the process 600 by receiving a voice bit stream including at least one frame of bits (602). Each frame of bits includes a plurality of block codes. The FEC decoder continues the execution of process 600 by determining $N_f$ least confident bits in a first block code among the block codes (604). The FEC decoder continues the execution of process 600 by generating $2^{N_f}$ candidates for the first block code based on the least confident bits (606). For example, $2^{N_f}$ candidates are formed by flipping all combinations of the $N_f$ least confident bits and passing the resulting candidates through a [24,12] Golay decoder.

The FEC decoder continues the execution of process 600 by determining a first distance between each candidate and the first block code (608). For example, the first distance is calculated according to Equation (6). The FEC decoder continues the execution of process 600 by demodulating at least one other block code among the block codes based on the first block code to obtain at least one demodulated vector (610). For example, the modulation vectors are computed according to Equations (7), (8), and (9) for each candidate. The modulation vectors are seeded by each candidate for the first block code.

The FEC decoder continues the execution of process 600 by determining a second distance, for each demodulated vector, between a demodulated vector and possible transmitted vectors associated with the demodulated vector (612). For example, the second distance is calculated according to Equations (10), (12), (14), (16), (18), and (20).

The FEC decoder continues the execution of process 600 by selecting, from the possible transmitted vectors, a vector corresponding to a minimum second distance as a corrected demodulated vector (614). For example, the minimum second distance is obtained according to Equations (11), (13), (15), (17), (19), and (21). The vector corresponding to the minimum second distance is selected.

The FEC decoder continues the execution of process 600 by determining a minimum total distance across all of the block codes (616). A total distance is a sum of the first distance and the minimum second distance associated with each demodulated vector. For example, the total distance $D_{T,n}$ is calculated according to Equation (22). The minimum total distance is obtained according to Equation (23).

The FEC decoder continues the execution of process 600 by selecting a candidate, from the candidates for the first block code, corresponding to the minimum total distance as a corrected first block code (618).

Decoding of Linked Block Codes

The techniques described in this disclosure can apply to any vocoders, such as a Project 25 half-rate vocoder and a Project 25 full-rate vocoder, etc.

The techniques can use any combination of Golay codes and Hamming codes. For example, the techniques are applicable to [24,12] Golay codes, [23,12] Golay codes, [16, 11] Hamming codes, [15,11] Hamming codes, shortened block codes, and other block code variations. The block codes which are modulated strengthen the block code (e.g., the first block code) which was used to seed the modulator.

The techniques can use different modulation approaches. The modulation sequence used in the Project 25 half-rate vocoder or Project 25 full-rate vocoder is one example modulation technique. Any modulation technique that produces a sequence of bits that can be used in the encoder and the decoder, such that bits in some block codes are made dependent on the bits in other block codes, is applicable. In some implementations, it is possible to seed the modulator from either a single block code or a plurality of block codes.

In some implementations, it is possible to cascade multiple modulators in a chain-like fashion. The first block code in the chain is strengthened by the later block codes in the chain. Note that each modulator in the chain may require evaluation of multiple decoding candidates. The total number of candidates can grow quickly. With two cascaded modulators, the number of candidates to be evaluated rises from $2^N$ to $2^{2N}$. Reducing N, the number of block code bits flipped (the number of the least confident bits) to form the candidates, can help to keep the number of computations smaller.

While the techniques are described largely in the context of an MBE Project 25 half-rate vocoder and an MBE Project 25 full-rate vocoder, the described techniques may be readily applied to other systems and/or vocoders. For example, DMR vocoders may also benefit from the techniques regardless of the bit rate or frame size. In addition, the techniques described may be applicable to many other speech coding systems that use a different speech model with alternative parameters (such as Sub-band Adaptive Transform Coding (STC), Mixed Excitation Linear Prediction (MELP), Multiband Harmonic Transform Coder (MB-HTC), (Code Excited Linear Prediction) CELP, Harmonic Vector Excitation Coding (HVXC) or others).

The techniques of error detection and error correction for digital speech transmission may be implemented by a speech decoder. The speech decoder may be included in, for example, a handset, a mobile radio, a base station, a console, a vehicle, an aircraft, etc.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Any of the above-described examples may be combined with any other example (or combination of examples), unless explicitly stated otherwise. The foregoing description of one or more implementations provides illustration and description, but is not intended to be exhaustive or to limit the scope of implementations to the precise form disclosed. Modifications and variations are possible in light of the above teachings or may be acquired from practice of various implementations.

Although the implementations above have been described in considerable detail, numerous variations and modifications will become apparent to those skilled in the art once the above disclosure is fully appreciated. It is intended that the following claims be interpreted to embrace all such variations and modifications.

We claim:

1. A method of decoding a digital speech signal, the method comprising:
   receiving a voice bit stream including at least one frame of bits, where each frame of bits includes block codes;
   determining least confident bits in a first block code among the block codes;
   generating candidates for the first block code based on the least confident bits;
   determining a first distance between each candidate and the first block code;
   demodulating at least one other block code among the block codes based on the first block code to obtain at least one demodulated vector;
   for each demodulated vector,
      determining a second distance between the demodulated vector and possible transmitted vectors associated with the demodulated vector;
      selecting, from the possible transmitted vectors, a vector corresponding to a minimum second distance as a corrected demodulated vector;
   determining a minimum total distance across all of the block codes, where a total distance is a sum of the first distance and the minimum second distance associated with each demodulated vector; and
   selecting a candidate from the candidates for the first block code as a corrected first block code, where the selected candidate corresponds to the minimum total distance.

2. The method of claim 1, wherein generating the candidates for the first block code further comprises flipping a combination of one or more of the least confident bits.

3. The method of claim 1, wherein the number of least confident bits is $N_f$, and the number of candidates for the first block code is $2^{N_f}$.

4. The method of claim 3, further comprising:
   decoding each of the candidates with a Golay decoder to generate decoded candidates, wherein the number of decoded candidates is $2^{N_f}$; and
   ignoring non-unique candidates among the decoded candidates to generate a set of unique candidates, wherein the number of unique candidates is less than $2^{N_f}$.

5. The method of claim 1, wherein demodulating the at least one other block code comprises reversing a modulation of each of the at least one other block code to obtain the demodulated vector using a modulation sequence, where the modulation sequence is seeded by one or more bits of the first block code.

6. The method of claim 5, wherein a seed of the modulation sequence is formed by dropping redundant bits in each candidate.

7. The method of claim 1, wherein the at least one demodulated vector is a Golay code vector, a Hamming code vector, or a combination of the Golay code vector and the Hamming code vector.

8. The method of claim 1, further comprising:
determining a second minimum total distance across all of the block codes; and
determining a difference between the minimum total distance and the second minimum total distance as a confidence measure.

9. The method of claim 1, further comprising determining the number of bit errors corrected in the block codes of each frame of bits, wherein the number of bit errors is the total number of bits flipped in both the corrected demodulated vector and the corrected first block code.

10. The method of claim 9, further comprising:
determining that the number of bit errors is more than a first threshold;
determining a second minimum total distance across all of the block codes;
determining a difference between the minimum total distance and the second minimum total distance as a confidence measure;
determining that the confidence measure is more than a second threshold; and
performing a frame repeat based on the determination that the number of bit errors is more than the first threshold or the confidence measure is less than the second threshold.

11. The method of claim 1, wherein the voice bit stream is generated by an MBE vocoder.

12. The method of claim 1, wherein the at least one frame of bits comprises one or more of voice frames, silence frames, and data frames.

13. A speech decoder configured to perform operations comprising:
receiving a voice bit stream including at least one frame of bits, where each frame of bits includes block codes;
determining least confident bits in a first block code among the block codes;
generating candidates for the first block code based on the least confident bits;
determining a first distance between each candidate and the first block code;
demodulating at least one other block code among the block codes based on the first block code to obtain at least one demodulated vector;
for each demodulated vector,
determining a second distance between the demodulated vector and possible transmitted vectors associated with the demodulated vector;
selecting, from the possible transmitted vectors, a vector corresponding to a minimum second distance as a corrected demodulated vector;
determining a minimum total distance across all of the block codes, where a total distance is a sum of the first distance and the minimum second distance associated with each demodulated vector; and
selecting a candidate from the candidates for the first block code as a corrected first block code, where the selected candidate corresponds to the minimum total distance.

14. A handset or mobile radio comprising the speech decoder of claim 13.

15. A base station or console comprising the speech decoder of claim 13.

* * * * *